United States Patent
Ho (10) Patent No.: US 10,417,669 B2
(45) Date of Patent: Sep. 17, 2019

(54) SYSTEM AND METHOD FOR TARGETED ADVERTISING ON PARCEL PACKAGES

(71) Applicant: Zadspace, Norwalk, CT (US)

(72) Inventor: James Chen-Hwa Ho, Redondo Beach, CA (US)

(73) Assignee: Zadspace, Norwalk, CT (US)

( * ) Notice: Subject to any disclaimer, the term of this patent is extended or adjusted under 35 U.S.C. 154(b) by 263 days.

(21) Appl. No.: 13/705,463

(22) Filed: Dec. 5, 2012

(65) Prior Publication Data

US 2013/0346156 A1 Dec. 26, 2013

Related U.S. Application Data

(63) Continuation-in-part of application No. 13/183,277, filed on Jul. 14, 2011, now abandoned, which is a continuation-in-part of application No. 11/461,622, filed on Aug. 1, 2006, now Pat. No. 8,744,910.

(51) Int. Cl.
*G06Q 30/00* (2012.01)
*G06Q 30/02* (2012.01)
*G06F 16/28* (2019.01)
*G09F 23/00* (2006.01)
*G09F 3/10* (2006.01)

(52) U.S. Cl.
CPC ....... *G06Q 30/0271* (2013.01); *G06F 16/283* (2019.01); *G06Q 30/0261* (2013.01); *G09F 3/10* (2013.01); *G09F 23/00* (2013.01)

(58) Field of Classification Search
CPC ............ G06Q 30/0271; G06Q 30/0261; G06F 16/283; G09F 23/00; G09F 3/10
See application file for complete search history.

(56) References Cited

U.S. PATENT DOCUMENTS

| 6,178,411 B1 * | 1/2001 | Reiter .......................... 705/408 |
| 6,273,986 B1 * | 8/2001 | Egan ........................ G09F 3/10 156/247 |
| 2005/0154641 A1 * | 7/2005 | Mortimer ............... B42D 15/00 705/14.25 |
| 2007/0043579 A1 * | 2/2007 | Kent .................. G06Q 30/0283 705/26.1 |

* cited by examiner

*Primary Examiner* — Raquel Alvarez
(74) *Attorney, Agent, or Firm* — Christopher J. Capelli (57) ABSTRACT

A method for displaying messages that are placed on packages being shipped to consumers in the form of labels that are targeted to specific consumers based on publicly available data or shopping behavior data. The method includes receiving information regarding one or more packages to be delivered to one or more recipients. The method also includes retrieving promotion data regarding one or more promotions targeted to the one or more recipients. One or more personalized promotion labels are generated from the promotion data.

10 Claims, 10 Drawing Sheets

SYSTEM AND METHOD FOR TARGETED ADVERTISING ON PARCEL PACKAGES

CLAIM OF PRIORITY

This application is a Continuation-In-Part of and claims priority to U.S. application Ser. No. 13/183,277, filed on Jul. 14, 2011, which is a Continuation-In-Part of and claims priority to U.S. application Ser. No. 11/461,622, filed on Aug. 1, 2006, which claims priority to U.S. application Ser. No. 11/423,692, filed on Jun. 12, 2006. These disclosures are hereby incorporated by reference herein in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to the field of targeted advertising and in particular to placing targeted advertisements on parcel packages shipped to a recipient.

BACKGROUND OF THE INVENTION

Advertisers place promotions or other advertisement in locations where they are viewed (and hopefully absorbed) by other persons or entities. These locations can be both physical and/or virtual (i.e., off-line and/or on-line). For example, such locations include television, newspapers, magazines, and the Internet. These advertisements or promotions can be directed regionally, according to cities, counties, states, or countries in which they are placed.

Additionally, a wide variety of different mediums may be utilized for advertising. Advertisers choose specific mediums and locations for the placement of their advertisements in order to attempt to expose the advertisement to an intended audience. For example, a marketer of female cosmetics may choose to build awareness for a new line of female cosmetics by placing an advertisement in a magazine that has a large readership of females.

Various methods of advertising and/or promoting have associated advantages and drawbacks. Thus, advertisers are often inclined to pay professional advertising organizations, entities, and individuals to target and dispense their advertisements, as they seek more effective mediums, locations, and techniques for targeting, placing, and measuring the effectiveness of promotions. The advertisements and/or promotions that are suggested or used by these entities typically include expensive media or printed materials that have high distribution costs associated with them. Even Internet-based promotions, which tend to be quite efficient, still have high costs associated with them, since popular web sites often charge a premium on a per-impression basis for placing banners or links on their web pages. Further, while Internet use has increased, it is desirable to provide a form of promotional advertisement that is more readily viewed by the consuming public without having to log on to a computer.

The assignee of the present invention described in previous applications, methods and systems for providing targeted advertisement on a package to be delivered to a recipient. Advertisement information is received from an advertiser that includes one or more advertisements that the advertiser desires to be placed. An advertisement for the package is either selected or created in response to analyzing the advertisement, package characteristics, and recipient characteristics. The advertisement is then placed on the package for delivery.

SUMMARY OF THE INVENTION

The present invention provides a method and system for placing targeted advertisements on parcel packages, preferably from an internal advertiser server. The method includes receiving information regarding one or more packages to be delivered to one or more recipients. The method also includes retrieving promotion data regarding one or more promotions targeted to the one or more recipients. One or more personalized promotion labels are generated from the promotion data. The one or more personalized promotion labels are transmitted to one or more output devices for placement of the one or more personalized promotion labels on the one or more packages.

Retrieving promotion data may include geographic targeting of the one or more recipients. Personalized promotion labels may include names of the one or more recipients and promotion data may include real-time offer dates. The one or more personalized promotion labels may include tracking code to verify distribution of the one or more personalized promotion labels. The method may further comprise specifying a location on the one or more packages to place the one or more personalized promotion labels by an advertiser providing the promotion data. According to some embodiments generating one or more personalized promotion labels may comprise generating personalized promotion labels for each of the one or more packages or generating personalized promotion labels for a subset of the one or more packages. Promotion data regarding one or more promotions may be retrieved based on the information regarding the one or more packages.

In some embodiments, profiles associated with the one or more recipients may be retrieved. Promotion data may be retrieved based on the profiles associated with the one or more recipients. The method may also include extracting one or more parameters associated with the information regarding the one or more packages and segmenting the one or more recipients into one or more marketing groups based on the one or more parameters. Retrieving one or more promotions targeted to the one or more recipients may comprise retrieving one or more promotions targeted to the one or more marketing groups.

Generating one or more personalized promotion labels may comprise generating one or more personalized promotion labels on an invoice or a shipping label. Certain embodiments may comprise printing the promotion labels. Decision trees may be used to match one or more promotions to the one or more recipients. Placement of a plurality of personalized promotion labels on a given package may be specified as well as placement of a single personalized promotion label on a given package may be specified.

A method according to an alternative embodiment includes scanning information regarding one or more packages to be delivered to one or more recipients. The information regarding the one or more packages is transmitted to a promotion targeting server. Promotion data regarding one or more promotions targeted to the one or more recipients of the one or more packages are received from the promotion targeting server. One or more promotions are printed and collated to correspond to the one or more packages by matching identifiers of the one or more promotions with the one or more packages. The one or more printed promotions are placed on the one or more packages.

Receiving promotion data regarding one or more promotions may comprise receiving promotion data regarding one or more promotions at a kiosk interface. One or more promotions may be printed from the kiosk interface. One or more promotions may also be viewed on the kiosk interface. In some embodiments, an email may be received upon receiving the promotion data. One or more promotions may also be printed upon receiving the promotion data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
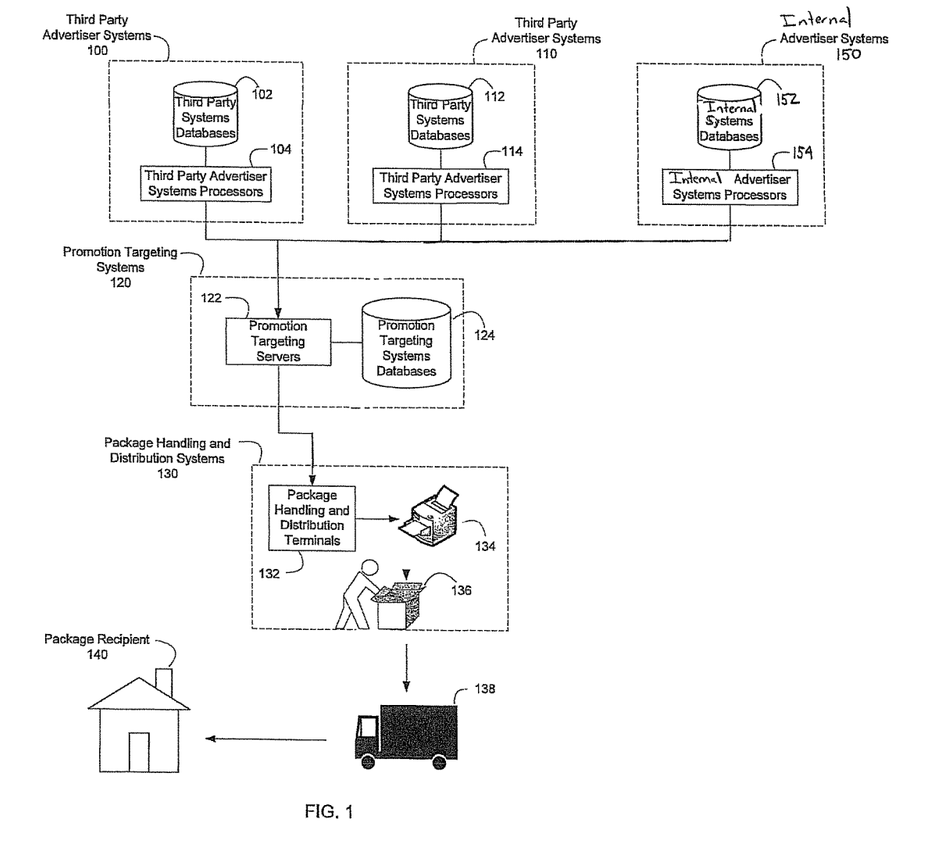
FIG. 1 illustrates a diagram of a system for providing targeted advertising on delivered parcel packages according to an embodiment of the present invention.

FIG. 1 presents a system for providing targeted advertising on delivered parcel packages according to an embodiment of the present invention. The system includes third party advertiser systems 100 and 110, internal advertiser system 150, promotion targeting systems 120, package handling and distribution systems 130, logistics 138, and package recipient 140.

Each of the advertiser systems 100, 110 and 150 may include systems databases 102, 112 and 152, and advertiser systems processors 104, 114 and 154. Third party advertiser systems 100 and 110 may represent two advertisers wishing to promote and advertise certain products or services while internal advertiser system 150 represents a parcel generator/distributor, such as that associated with package handling and distribution systems 130 also wishing to promote and advertise certain of its own products or services. Each of the third party advertiser systems 100 and 110, and internal advertiser system 150, may use advertiser systems processors 104, 114 and 154 to create or retrieve targeted offers, advertisements or promotions. Targeted offers may include offers directed to certain consumers, such as package recipients that have purchased certain goods to be delivered, for upselling another product, cross-selling another product, encouraging a new order and/or presenting a loyalty offer.

Frequently, advertisers desire to target their promotions to the specific demographics of users. For example, and not by way of limitation, targeted demographic selections may include: gender, household income, age, geographic region, or language. Additionally, some advertisers may desire to further target their promotions to specific individuals who meet particular parameters. In this regard, "targeting" is a technique that advertisers use to attempt to increase the effectiveness of an advertisement. Targeting allows advertisements to be directed or focused towards specific individuals or groups who are likely to be interested in, or influenced by, the advertisement. It is to be understood and appreciated "targeting" encompasses providing an advertisement/promotion to a group of consumers/clients associated with a particular package handling and distribution systems 130, preferably via internal advertiser system 150. Noted benefits of such internal targeting includes using logic predicated on credit availability for a group of consumers/clients; encouraging a new order with a discount (or offer for free shipping); cross-selling an item (e.g., offering to sell a belt if pants were purchased); and/or encouraging a new order using a promotion (e.g., buy-one-get-one-free). It is to be further appreciated "targeting" may additionally include selection of a target promotion is contingent upon: an order source (e.g., orders purchased via a mobile device relative to orders placed via desktop computering device); a consumer type (e.g., is the ordering consumer: new; a lapsed customer/client; frequent or infrequent customer, etc.); and/or time period of order (e.g., time of day, day, month, season or holiday).

Through the use of targeted advertising, an advertiser may reduce the expense of disseminating advertisements to uninterested parties. In this manner, the overall effectiveness and efficiency of an advertising campaign can be increased due to the reduction in cost from decreased dissemination of advertisements to uninterested parties.

Targeted offers may be stored and indexed in systems databases 102, 112 and 152 for retrieval. Advertiser systems 100 and 110 may be advertising clients of promotion targeting systems 120 while advertising system 150 may be one in the same with targeting system 120. In one embodiment, third party advertisers may pay certain fees in exchange for distribution of the targeted offers or promotions by promotion targeting systems 120. Fees may be paid on the basis of an amount of promotions sold and printed.

Promotion Targeting Systems 120 includes promotion targeting servers 122 and promotion targeting systems databases 124. Promotion targeting servers 122 may receive targeted promotions from advertiser systems 100, 110 and 150. The targeted promotions received from the advertiser systems may be associated with certain advertising parameters provided by the advertiser systems. The advertising parameters, for example, may be an intended target audience. The targeted promotions and the advertising parameters may be stored and indexed in promotion targeting systems databases 124. Promotions stored in promotion targeting systems databases 124 may selected and retrieved for transmission to package handling and distribution systems 130.

Package handling and distribution systems 130 include package handling and distribution terminals 132, printer 134 and package 136. Package handling and distribution systems 130 may be a location where a business ships products from its warehouses to customers. The business may establish a partnership with promotion targeting systems 120 to receive revenue from promotion targeting systems 120 in exchange for placing promotions specified by the promotion targeting systems on outgoing packages. Package handling and distribution terminals 132 may be used to view, manage, and print promotion labels on printer 134. Terminals may comprise a desktop personal computer, workstation, laptop, personal digital assistant (PDA), cell phone, or any computing device capable of connecting to a network. The terminals may also comprise a graphical user interface (GUI) or a browser application provided on a display (e.g., monitor screen, LCD or LED display, projector, etc.).

Promotion targeting servers 122 may determine a targeted promotion suitable for a package 136. Package 136 may correspond to a package recipient 140. On the basis of information associated with the package recipient 140, promotion targeting servers 122 may determine an appropriate promotion for package recipient 140. The information associated with package recipient 140 may include a recipient name, recipient address, product information (e.g., a stock-keeping unit (SKU) number), product category, etc. Promotion targeting servers 122 may use various geographic, demographic, socio-economic and purchasing behavior factors to determine an appropriate promotion for package recipient 140.

Targeted promotions may be printed on either color and/or black & white labels and placed on packages being shipped to consumers from package handling and distribution systems 130. It is to be understood and appreciated that printed targeted promotions may be simultaneously printed with shipping information on a single label, which label may then be affixed to a parcel by either automation or hand. It is to be further understood and appreciated that alternative to printing promotions on labels, such promotions may be directly printed upon the parcel itself (e.g., a container box) thus obviating the requirement for a separate label and the effort needed to affix a label to a container.

Package handling and distribution systems may be paid guaranteed fees to place promotions on their outgoing package box location or "real estate." In an alternative embodiment of the present invention, package handling and distribution systems 130 may use this customer touch-point to deliver their own offers that up-sell, cross-sell, or drive consumers to a web site or retail location. Third party advertisers may pay for each promotion that is printed and placed on an outgoing package.

In certain embodiments, promotions are preferably approved or disapproved by the business entity that controls the package handling and distribution systems 130. Thus promotions determined not to be appropriate (e.g., promote competitive services/goods, etc.) are thwarted from being applied to parcels. Additionally, eligibility of a given promotion for a given parcel 136 may be determined by a promotion targeting system 120.

As indicated above, promotion targeting systems 120 may provide objectionable promotions or promotions that may conflict with the business practices of package handling and distribution systems 130. Approved promotions may be indexed and hosted by promotion targeting servers 122. The hosted promotions may be accessed by package handling and distribution systems 130 via a user interface to promotion targeting systems 120 for printing of the promotions at a package handling and distribution system location. According to one embodiment of the present invention, promotions may be downloaded and cached at package handling and distribution system for later retrieval and printing. Equipment used to access and print the promotions may include hardware and software provided by the promotion targeting systems. In an alternative embodiment of the present invention, package handling and distribution systems 130 may use existing equipment present in their location to access and print the promotions hosted by promotion targeting systems 120.

The printed promotions may include high resolution promotions in the form of labels. The promotion labels may be printed on demand and produce color or black and white labels of varying dimensions with personalized offers that are applied to outgoing packages. The promotion labels may be offered to parcels being shipped from package handling and distribution systems 130 to the consumers. Promotion labels printed and placed on the parcel packages may be highly targeted and personalized to the individual customers or recipients. The promotions contained on the labels may be relevant as they can be micro-targeted to individual consumers. Placing promotions on packages may engage consumers as the promotions may anticipate the reveal of a recent purchase. Packages ready for shipment may be delivery by logistics 138 to a package recipient 140. Package recipient 140 may receive the package with valuable promotional offers on the packaging. As a result, the printed promotions may drive retail sales and direct consumer sales.

Figure 2:
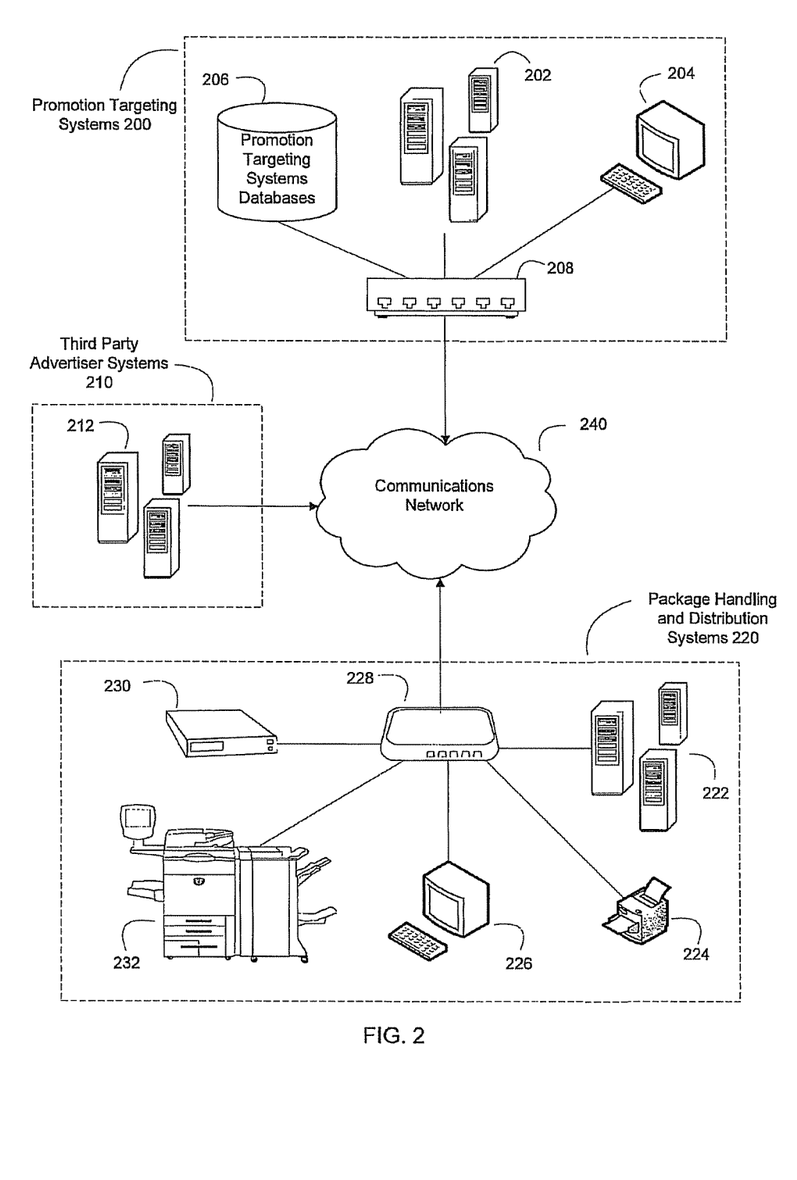
FIG. 2 illustrates a component diagram of a system for providing targeted advertising on delivered parcel packages according to an embodiment of the present invention.

FIG. 2 presents a system for providing targeted advertising on delivered parcel packages according to an embodiment of the present invention. The system includes promotion targeting systems 200, third party advertiser systems 210, package handling and distribution systems 220 and communications network 240.

Promotion targeting systems 200 also includes promotion targeting systems servers 202, promotion targeting systems terminal 204, promotion targeting systems databases 206 and switch 208. Promotion targeting systems servers 202 may receive targeted promotions from third party advertiser systems servers 212 via communications network 240. The targeted promotions may be stored and later retrieved from promotion targeting systems databases 206 by promotion targeting systems servers 202. Promotion targeting systems servers 202 may also include processing devices and logic to determine appropriate promotions for each package recipient. Determination of appropriate promotions may include decision analysis using decision trees, graphs or models. The decision analysis may be used to retrieve promotions based information including geographic, demographic, and/or behavioral data of a user for targeting. Such information of the user may be supplied by the promotion targeting systems 200 or from the package handling and distribution systems 220. Promotion targeting systems terminal 204 is operable to manage, view and edit the decision analysis and targeted promotions.

Switch 208 provides for the facilitation of data and communication between the various components in promotion targeting systems 200 with third party advertiser systems 210 and package handling and distribution systems 220 through communications network 240. Communications network 240 may be any suitable type of network allowing transport of data communications across thereof. In one embodiment, the network may be the Internet, following known Internet protocols for data communication, or any other communication network, e.g., any local area network (LAN), or wide area network (WAN) connection.

Package handling and distribution systems 220 may include package handling and distribution systems servers 222, warehouse printer 224, package handling and distribution systems terminal 226, switch 228, promotion targeting systems appliance 230, and promotion printer 232. Package handling and distribution systems servers 222 may include hardware and software operable to perform processing of orders, shipping information, inventory, invoices, and other warehouse management operations of the package handling and distribution systems. Warehouse printer 224 may print invoices and labels. Promotion labels may be printed from promotion printer 232. Promotion labels are not limited to being printed from promotion printer 232. In an alternative embodiment of the present invention, printer 224 or any off the shelf printer may be used to print promotion labels received from promotion targeting systems 200. For example, smaller printers residing at individual packing stations within a warehouse at package handling and distribution systems 220 may be used to print promotion labels.

Package handling and distribution systems terminal 226 may be operable to access and provide an interface to manage the orders, shipping information, inventory, invoices and other warehouse management operations. In addition, terminal 226 may also be able to access, manage, view and print promotion labels received from promotion targeting systems 200. Promotion targeting systems appliance 230 may include a controller and/or storage device for providing a kiosk interface and managing printing from promotion printer 232. Appliance 230 may be used to create print jobs for printing batches of promotion labels. Appliance 230 or servers 222 may also store targeted promotion image files received from promotion targeting systems 200. Switch 228 provides for the facilitation of data and communication between the various components in package handling and distribution systems 220 and promotion targeting systems 200 through communications network 240.

According to an alternative embodiment of the present invention, pre-printed promotion labels may be printed at promotion targeting systems 200 (described in further detail below regarding FIG. 3) and delivered physically to the facilities of package handling and distribution systems 220. The pre-printed promotion labels may be affixed to outgoing packages "as is" or fed into either printer 224 or 232 for printing of further detail or information on the pre-printed promotion labels. Pre-printed promotion labels may serve as template promotion labels providing all the basic promotion information but require printing of further specific details at package handling and distribution systems 220. Further details may include consumer name, promotion dates, or any other information that is determined upon shipping of a package. Promotion targeting systems 200 may provide package handling and distribution systems 220 with a variety of pre-printed promotion labels from various third party advertisers. In one embodiment, packages may be scanned at package handling and distribution systems 220 to transmit package information to promotion targeting systems 200, wherein upon receiving the package information, promotion targeting systems 200 may specify to match, collate and affix specific pre-printed promotion labels to outgoing packages. The specified pre-printed promotion labels may either be further printed with personalized information (e.g., a consumer's name) or placed on a package "as is." In yet another embodiment of the present invention, promotion targeting systems 200 may digitally transmit template promotion labels to package handling and distribution systems 220 for addition of personalized information similar to template pre-printed promotion labels.

Figure 3:
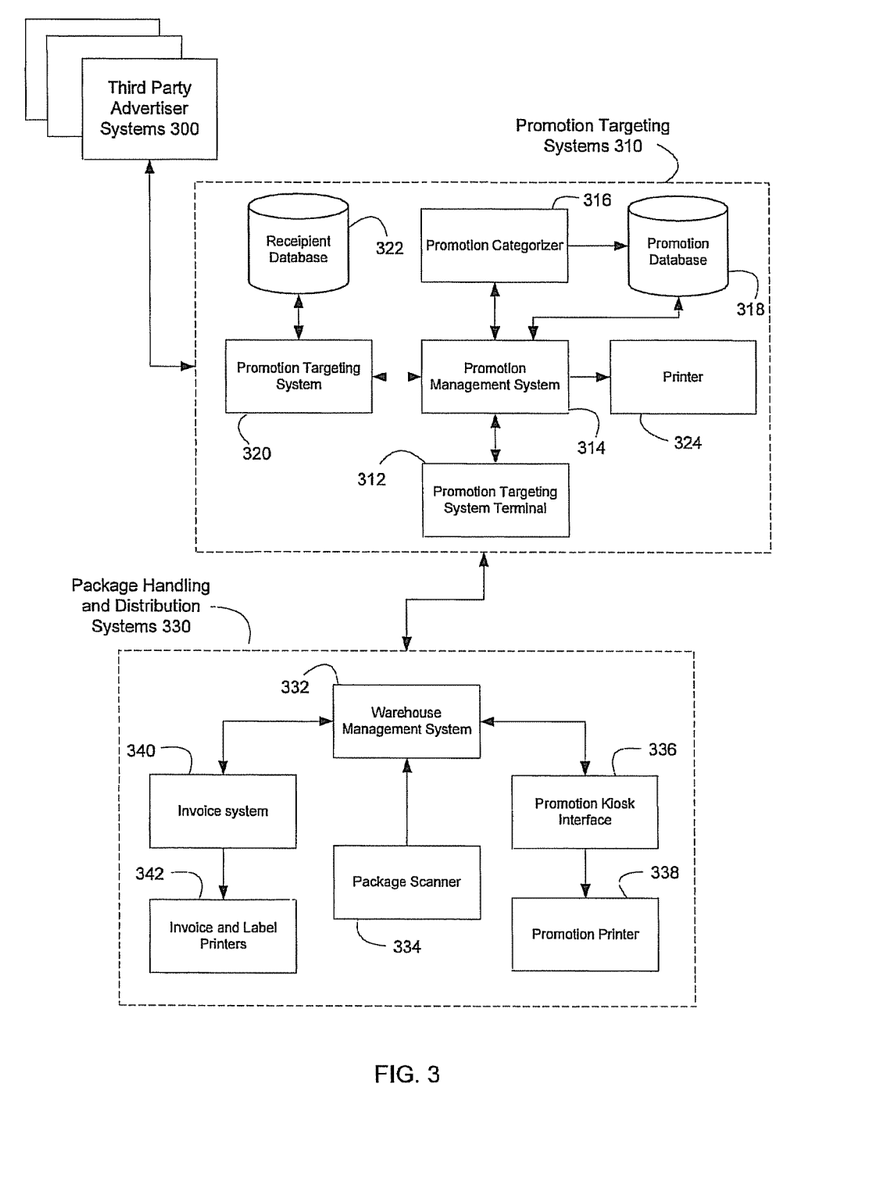
FIG. 3 illustrates a block diagram of a parcel targeted advertising system according to an embodiment of the present invention.

FIG. 3 presents a parcel targeted advertising system according to an embodiment of the present invention. The advertising system includes third party advertiser systems 300, promotion targeting systems 310 and package handling and distribution systems 330.

Promotion targeting systems 310 also includes promotion targeting system terminal 312, promotion management system 314, promotion categorizer 316, promotion database 318, promotion targeting system 320, recipient database 322 and printer 324. Promotion targeting systems 310 may receive targeted promotions from a plurality of third party advertiser systems 300. The targeted promotions may be analyzed by promotion management system 314 and indexed into promotion database 318 by promotion categorizer 316. Promotion targeting system terminal may be used to view and manage operation of the promotion management system 314. Promotion targeting systems 310 may also receive a promotion request from package handling and distribution systems 330. The promotion request may be received from warehouse management system 332 upon scanning package information. Packages or orders may be scanned at package handling and distribution systems 330 using package scanner 334 at a warehouse kiosk. The packages may be scanned using any of barcode, Radio-frequency Identification (RFID) or any other technology using a reader and tag. Scanning may include any form of information capture used to collect various attributes associated with the one or more packages. In an alternative embodiment, scanning may be performed at individual printer kiosks and/or individual packing stations. A job request may be initiated by sending the parcel information to promotion targeting systems 310.

Promotion requests may be received by promotion management system 314 to determine an appropriate promotion for each request. The package information may include information identifying the recipient of the package. Identification of the recipient may be forwarded to promotion targeting system 320 to match a targeted and personalized promotion with the recipient. Promotion targeting system 320 may include software, logic or hardware to segment individual consumers into actionable groups defined by marketers. The actionable groups may be based on geographic, demographic, socio-economic and purchasing behavior factors. For example, a given promotion may be targeted to recipients living in certain geographic regions. Methods for matching a targeted advertisement with a recipient may include the use of decision trees or other matching algorithms known by one of ordinary skill in the art and a weighting system such as the one described in commonly owned U.S. Patent Publication No. 2008/0010115 entitled "PARCEL ADVERTISING SYSTEM AND METHOD," the disclosure of which is hereby incorporated by reference in its entirety.

Geographic, demographic, socio-economic and purchasing behavior information of recipients may be stored in recipient database 322. Recipient information stored in database 322 may be gathered from user profiles generated by promotion targeting system 320 or from information provided by package handling and distribution systems 330. Promotion management system 314 may identify a targeted promotion matched by promotion targeting system 320 and record the package with the matching promotion on a list. The list may be loaded on promotion management system 314 and accessed by promotion kiosk interface 336 for retrieval of promotions from promotion database 318.

Promotion kiosk interface 336 may include an interface to promotion management system 314 for viewing, managing, and printing promotion labels on promotion printer 338. Promotion labels available for printing may be selected and transmitted to kiosk interface 336 for printing on promotion printer 338. In one embodiment, a plurality of promotion labels for packages may be batched in "waves." Waves of packages may be determined by time, quantity of job requests, recipients, etc. For each package and promotion label belonging to a wave, a subset of sequence numbers may be assigned to items belonging to the wave. In wave printing, a promotion label may be printed, matched and collated with each package invoice, providing every package in the warehouse with a promotion label. In an alternative embodiment, labels may be printed on demand for selective invoices or packages at individual packing stations. In certain embodiments, printer 324 in promotion targeting systems 310 provides for printing of pre-printed promotion labels. A variety of pre-printed promotion labels from third party advertisers may be printed at promotion targeting systems 310 to alleviate printing duties at package handling and distribution systems 330. The pre-printed promotion labels can be delivered to a package handling and distribution systems location for placement on future outgoing shipments.

Package handling and distribution systems 330 also includes invoice system 340 coupled to warehouse management system 332. Invoice system 340 generates invoices for orders placed on outgoing packages. Invoices and shipping labels may be printed on invoice and label printers 342. In some embodiments, invoice and label printers may also print promotion labels individually or on the same form, alongside with the invoices or shipping labels to ensure that the correct targeted promotion is affixed to the correct outgoing shipment or package, which is described in further detail below regarding FIG. 6.

Figure 4:
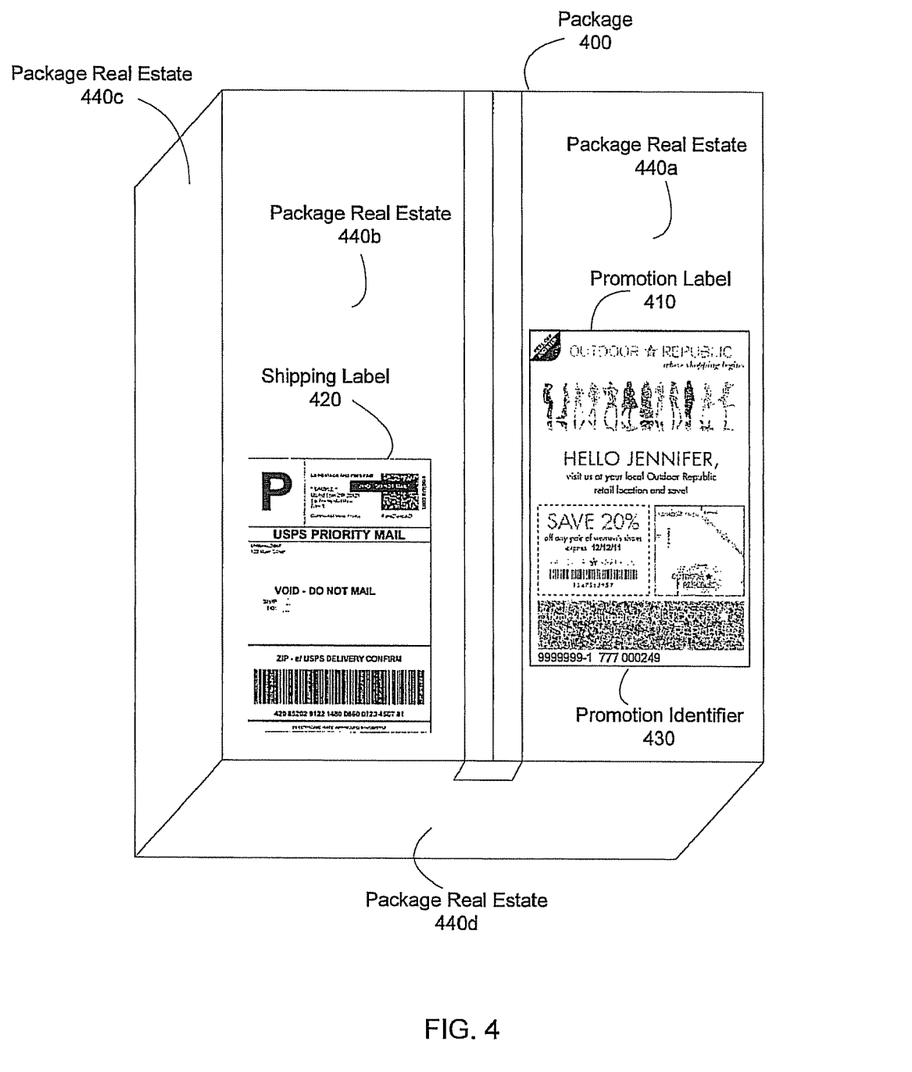
FIG. 4 illustrates a perspective view of a package that includes a promotion label, in accordance with an embodiment of the present invention.

FIG. 4 illustrates a package 400 including a promotion label 410 placed next to a shipping label 420. Promotion label 410 includes a promotion identifier 430 that may correspond to a recipient, invoice, order, package or shipment identifier assigned by a warehouse management system. The promotion identifier 430 may serve to specify a particular parcel package to place the promotion label on. Often times, this identifier is printed on a pack slip, invoice form or shipping label. Promotion identifier 430 may be assigned any number, series or sequence number defined by the package handling and distribution systems or the promotion targeting systems.

Similar to web pages possessing advertising space, a parcel may include package "real estate." As illustrated, promotion label 410 is placed at package real estate 440a (right flap of the box) and shipping label 420 is placed at package real estate 440b (left flap of the box). Other (non-exhaustive) examples of package real estate may include 440c and 440d. In most cases, package real estate 440a and 440b are considered "prime" package real estate given their prominent location on the package that guarantees a noticeable display to a recipient of the package. Meanwhile, package real estate 440c and 440d may be lesser desirable locations to place a promotion label. According to one embodiment of the invention, any one of third party advertiser systems, promotion targeting systems or package handling and distribution systems may specify where a given printed promotion should be placed on a package. In another embodiment, any number of promotion labels may be placed on a given package.

Figure 5:
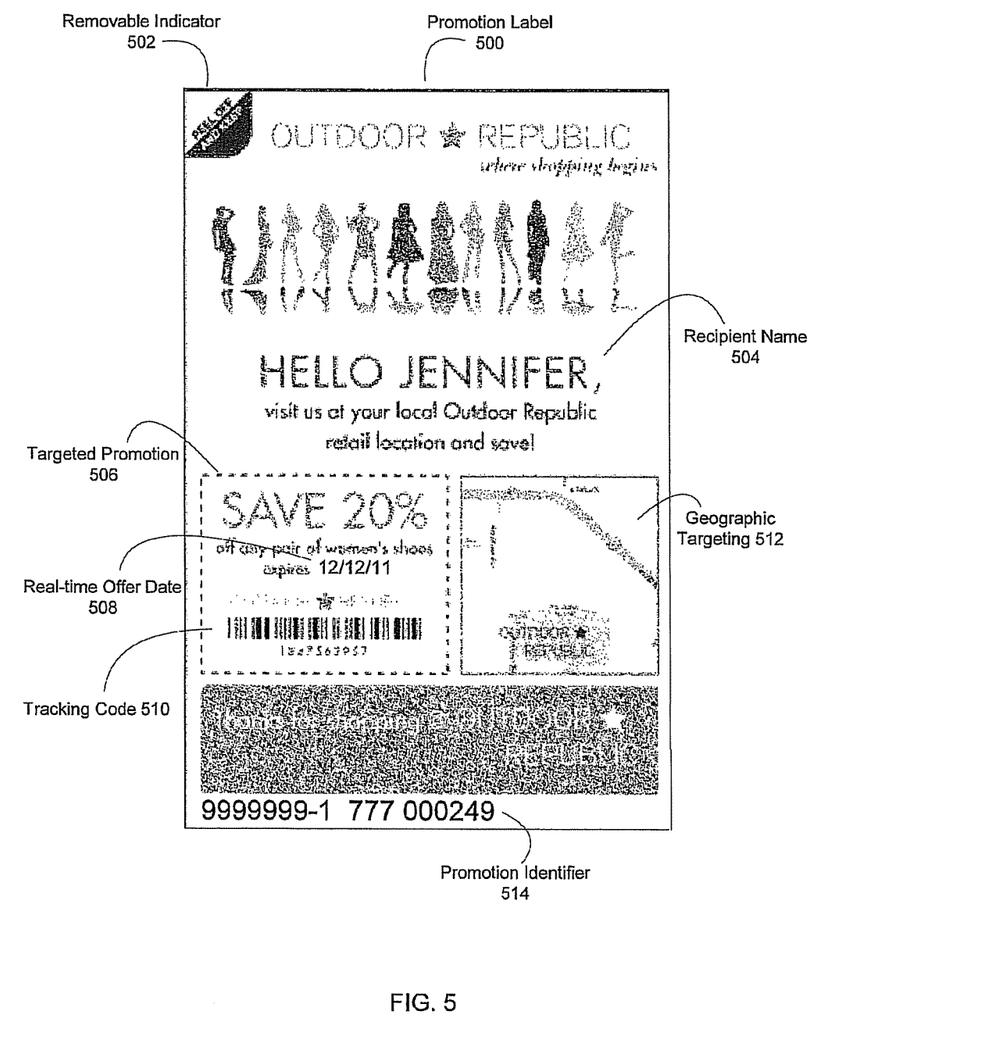
FIG. 5 illustrates a promotion label according to an embodiment of the present invention.

FIG. 5 presents a promotion label 500 according to one embodiment of the present invention. Promotion label 500 includes removable indicator 502, recipient name 504, targeted promotion 506, real-time offer date 508, tracking code 510, geographic targeting 512, and promotion identifier 514. Often times, a regular label can be difficult to remove without damaging the label. Removable indicator 502 allows a recipient of a package with a promotion label, such as the one illustrated in this figure, to easily peel the promotion label from the adhesive backing of the label for safekeeping. Promotion label 500 also includes recipient name 504, which creates a sense of personalization on the promotion label, and targeted promotion 506 that is based on a recipient's characteristics.

Targeted promotion 506 may be a uniquely generated offer based on the recipient or the recipient's characteristics. In one embodiment, promotion labels from a given third party advertiser may be generated with a common appearance but differ from recipient to recipient. The targeted promotion 506 includes a real-time offer date 508 and tracking code 510. Real-time offer date may be dynamically generated upon creation of the promotion label 500 or targeted promotion 506. Tracking code 510 may be scanned or typed to redeem the targeted promotion 506 either in a brick and mortar retail store or online. In some embodiments, tracking code 510 may also be used to track and confirm receipt and proper affixation of promotion labels to parcel packages.

Promotion identifier 514 corresponds to a recipient, invoice, order, package or shipment identifier to place the promotion label on. Geographic targeting 512 may indicate a targeted region, the recipient's location, a retail location, or the retail location in reference to the recipient's location. In another embodiment, the targeted promotion may be valid only at a retail store indicated by geographic targeting 512. Targeting to recipient characteristics enable marketers to serve relevant advertisements or promotions to individual consumers. FIG. 5 illustrates a specific, non-limiting example of a promotion label and any number of recipient characteristics may be used in creating promotion label 500. In other embodiments of the present invention, a promotion label may include other forms of advertisement or message delivery such as instantly redeemable coupons (IRCs), die cuts, foils, scents and printing directly on packages.

Figure 6:
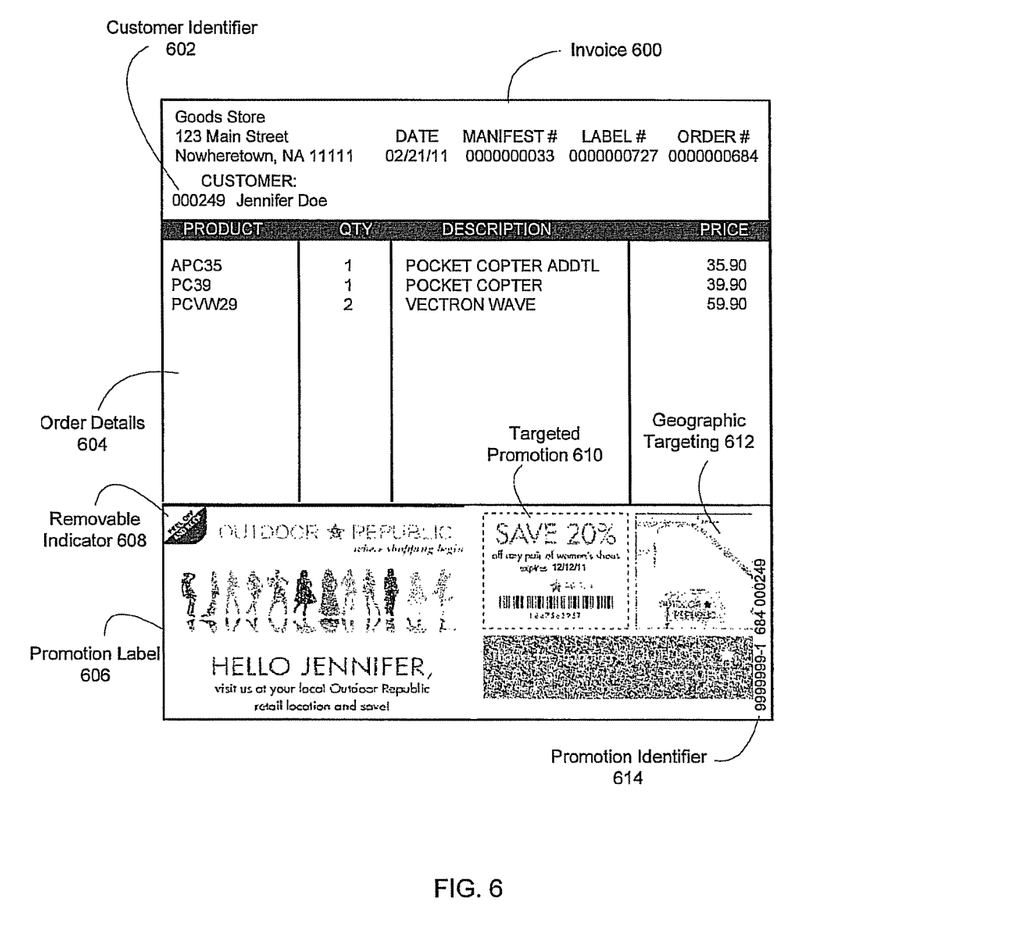
FIG. 6 illustrates an invoice with a promotion label according to an embodiment of the present invention.

FIG. 6 presents an invoice 600 according to an embodiment of the present invention. Invoice 600 includes customer identifier 602, order details 604 and promotion label 606. In this embodiment, a promotion label 606 is integrated with, placed, or printed below an invoice 600. A warehouse printer may be programmed and fed a promotion to be printed on the same form alongside an invoice and/or shipping label. If there happens to be no matching promotions from advertisers for a given package recipient, the integrated form may show a blank promotion label. In another embodiment, the integrated form may be re-sized or truncated if there are no promotions to print. Positioning of the promotion label is not limited to the illustrated configuration and may be placed or printed anywhere on a package or label in conjunction with the invoice 600.

The exemplary invoice 600 shows a customer identifier 602 with a customer's name and order details 604 showing an itemized listing of ordered products. Customer identifier 602 may be used to match a promotion with a promotion identifier 614 to the invoice. In an integrated invoice, the customer identifier 602 may be matched with the promotion identifier 614 by an operator at the warehouse or by a warehouse management system. Promotion label 606 includes removable indicator 608, targeted promotion 610, geographic targeting 612 and promotion identifier 614 similar to the promotion label illustrated in FIG. 5. A recipient may peel promotion label 606 to remove it from the invoice at the removable indicator 608. Targeted promotion 610 may be redeemed by the recipient at a retail store shown by geographic targeting 612 or at other retail locations.

Figure 7:
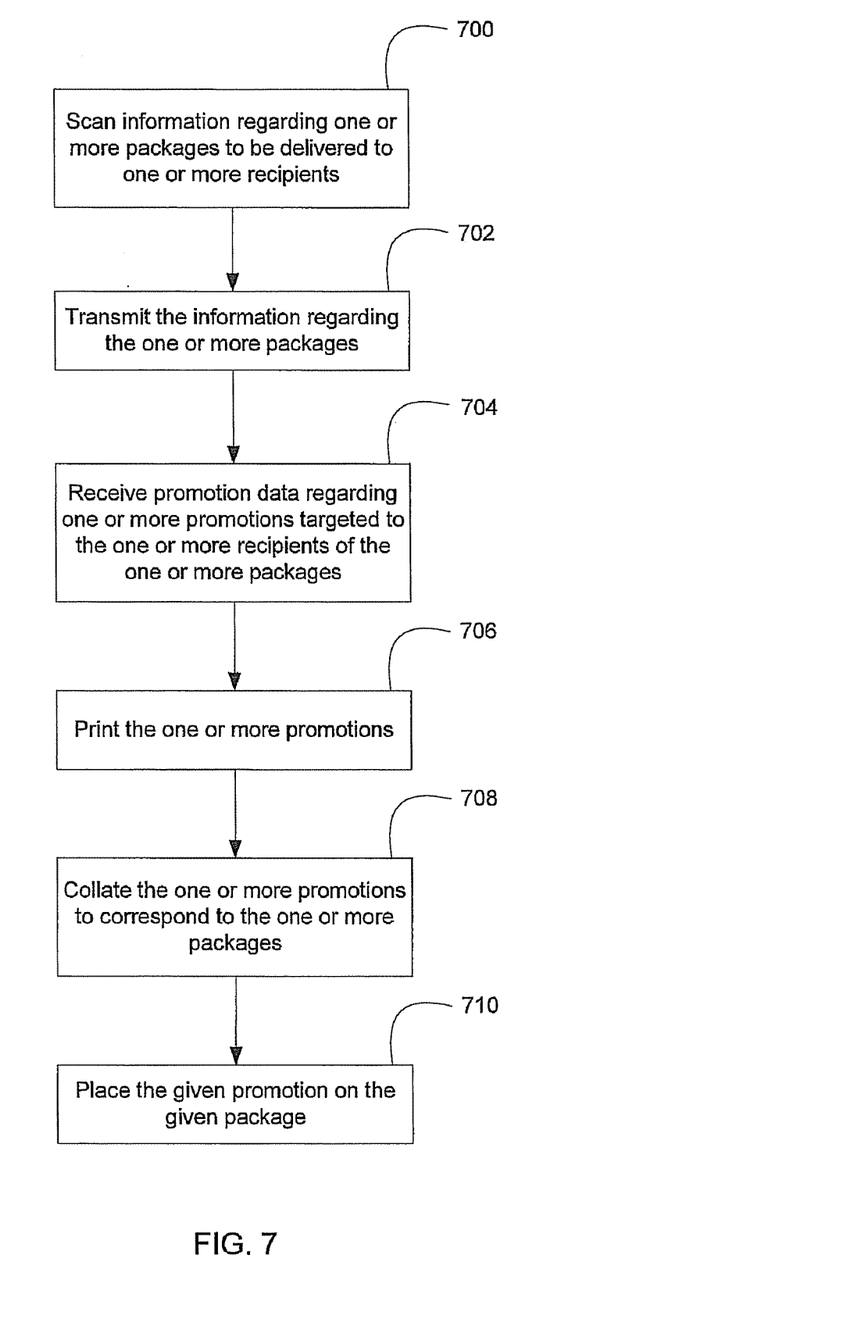
FIG. 7 illustrates a flowchart of a method for obtaining a promotion for a package according to an embodiment of the present invention.

FIG. 7 presents a method for obtaining a promotion for a package according to an embodiment of the present invention.

In step 700, information regarding one or more packages to be delivered to one or more recipients is scanned, step 700. Scanning may include any form of information capture used to collect various attributes associated with the one or more packages. The information may include data collected at the warehouse or a packing station within the warehouse regarding package recipients including, but not limited to, names and addresses. This information may be sent to a warehouse management system where the information regarding the one or more packages is transmitted, step 702. The information may be transmitted to a promotion targeting system for the retrieval of promotions. Package information may be transmitted to the promotion targeting system as a XML formatted file (or any other suitably formatted file) from the warehouse management system via FTP (or any other transmission means).

It is noted that in some embodiments, it may be determined that there are no available promotions for some of the scanned packages. There may also be some instances where promotion labels are unavailable for the reason that the transmitted package information may be awaiting processing at the promotion targeting system. Once processing has been completed, promotion targeting system may indicate availability of promotion labels that were previously unavailable. In cases where there are no available promotions even after processing, packages may be shipped without promotion labels. In another embodiment, if a promotion targeting system does not provide a promotion, the package handling and distribution systems may supply their own promotions.

Promotion data regarding one or more promotions targeted to the one or more recipients of the one or more packages are received in step 704. The promotion data may be received and requested from a kiosk interface with the promotion targeting system. The interface may indicate the status or availability of the one or more promotions for one or more packages and provide an option to view and print the one or more promotions. In one embodiment, notifications may be sent to email addresses to indicate promotion label availability. In another embodiment, the interface may provide the option to automatically print promotions as they become available from the promotion targeting system.

A next step 706 includes printing the one or more promotions. The one or more promotions may be printed on promotion labels from one or more printers in a warehouse located at a package handling and distribution system location. The one or more promotions are collated to correspond to the one or more packages in step 708. The promotions may be printed and collated by code or promotion identifiers with each outgoing shipment such that a specific promotion label is matched with a specific package recipient. This may be carried out by pairing up invoices with promotion labels. In one embodiment, each and every outgoing package may be assigned with at least one promotion label. In an alternative embodiment of the present invention, only selective packages may be scanned or assigned a promotion label. This decision may be made by either the promotion targeting systems or the package handling and distribution systems. Once the given promotion label is matched up with its corresponding package, the given promotion is placed on the given package, step 710.

Figure 8:
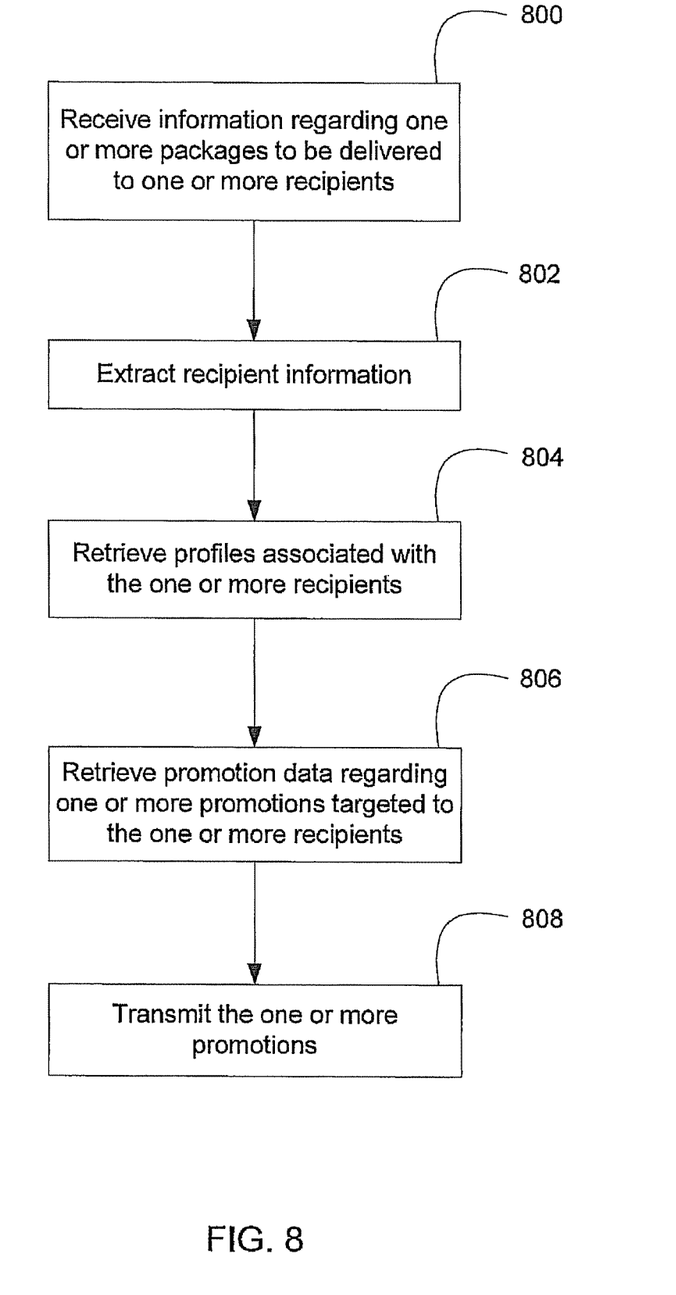
FIG. 8 illustrates a flowchart of a method for providing promotions to a package distributor according to an embodiment of the present invention.

FIG. 8 presents a method for providing promotions to a package distributor according to an embodiment of the present invention. Information regarding one or more packages to be delivered to one or more recipients is received at a promotion targeting system in step 800. Recipient information is extracted from the package information, step 802. The extracted recipient information may include recipient names, addresses, identifiers, or any other information useful in identifying the one or more recipients.

Step 804 includes retrieving profiles associated with the one or more recipients. The profiles may be generated by the promotion targeting system or from information provided by package handling and distribution systems. Information stored in the profiles may include geographic, demographic, socio-economic and purchasing behavior information associated with the one or more recipients. It is noted that in some embodiments, it may be determined that there are no available promotions for some of the scanned packages, as described above regarding FIG. 7. The promotion targeting system may indicate to a package handling and distribution systems facility the availability of promotion labels for the one or more packages via an interface or kiosk.

In a next step 806, promotion data regarding one or more promotions targeted to the one or more recipients are retrieved. A targeted promotion from a third party advertiser may target recipients with certain parameters, for example, being located in a specific geographic region and belonging to a certain demographic group. Parameters of the one or more recipients may be determined from the package information and the recipient information. The promotions may be retrieved using decision trees, graphs or models to match specific promotions with specific customers or packages. A decision tree is a decision support tool that uses a tree-like graph or model of decisions and their possible consequences, including chance event outcomes, resource costs, and utility. A decision tree may be used where the expected values (or expected utility) of competing alternatives are calculated. A decision tree includes splitting paths where each node indicates a decision made on, for example, the above-mentioned geographic, demographic, socio-economic and purchasing behavior. Analysis can take into account the decision maker's (the third party advertiser) preference or utility function. In this example, the preference or utility function pertains to the third party advertiser's targeting parameters.

The one or more promotions are transmitted to the package handling and distribution systems, step 808. At the package handling and distribution systems, the one or more transmitted promotions may be printed on promotion labels and placed on outgoing parcel packages.

Figure 9:
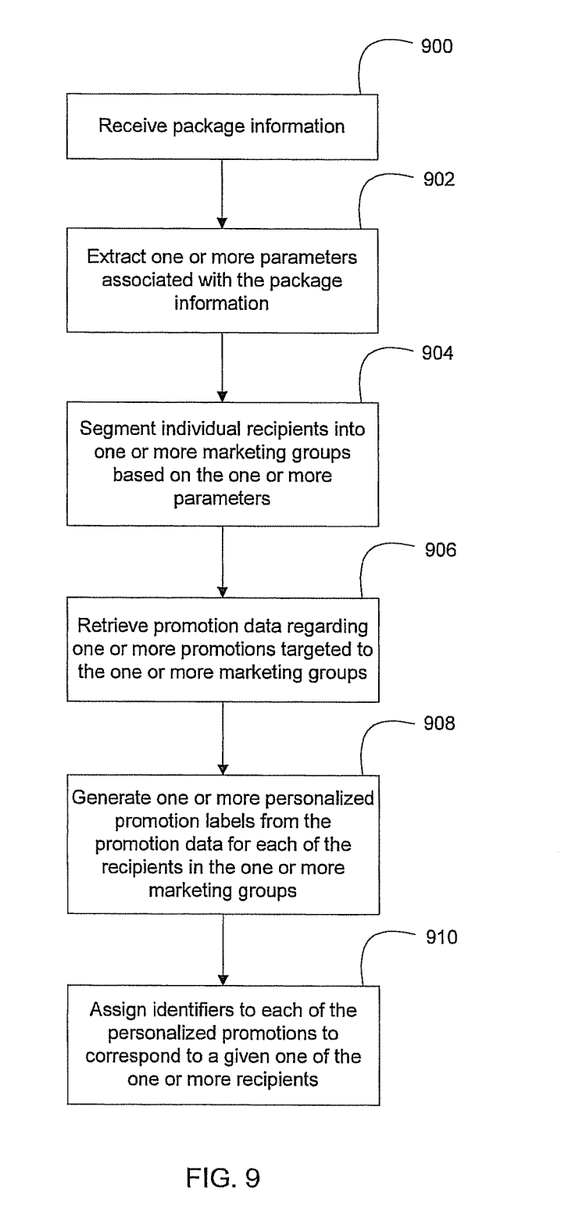
FIG. 9 Illustrates a flowchart of a method for retrieving promotions targeted to recipients of packages according to an embodiment of the present invention.

FIG. 9 presents a method for retrieving promotions targeted to recipients of packages according to an embodiment of the present invention.

Package information is received, step 900. The package information may include recipient names, recipient addresses, product information and product category. One or more parameters associated with the package information are extracted, step 902. Parameters extracted from the package information may include, for example, geographic information associated with the recipients. Other parameters that may be extracted from the package information may include the demographic, socio-economic and purchasing behaviors. Extracting parameters from the package information may also include retrieving a recipient profile associated with the recipients and extracting parameters from the recipient profiles.

Individual recipients are segmented into one or more marketing groups based on the one or more parameters, step 904. Each group may include recipients with common parameters where specific promotions may be selected for each group on the basis of the common parameters. The specific promotions may include promotions with one or more targeting parameters matching the one or more parameters of the marketing groups.

In a next step 906, promotion data regarding one or more promotions targeted to the one or more marketing groups are retrieved. The promotion data may be retrieved from a promotion targeting systems database containing a plurality of third party advertiser promotions. One or more personalized promotion labels are generated from the promotion data for each of the recipients in the one or more marketing groups, step 908. The one or more personalized promotion labels may include additional details and personalization added to the one or more retrieved promotions. For example, the recipients' names and geographic targeting information may be customized on a personal level for each promotion label. Identifiers are assigned to each of the personalized promotions to correspond to a given one of the one or more recipients, step 910. The identifiers are included with the promotion labels to help packers at a package handling and distribution systems location to identify the proper promotion label for a recipient or package.

Figure 10:
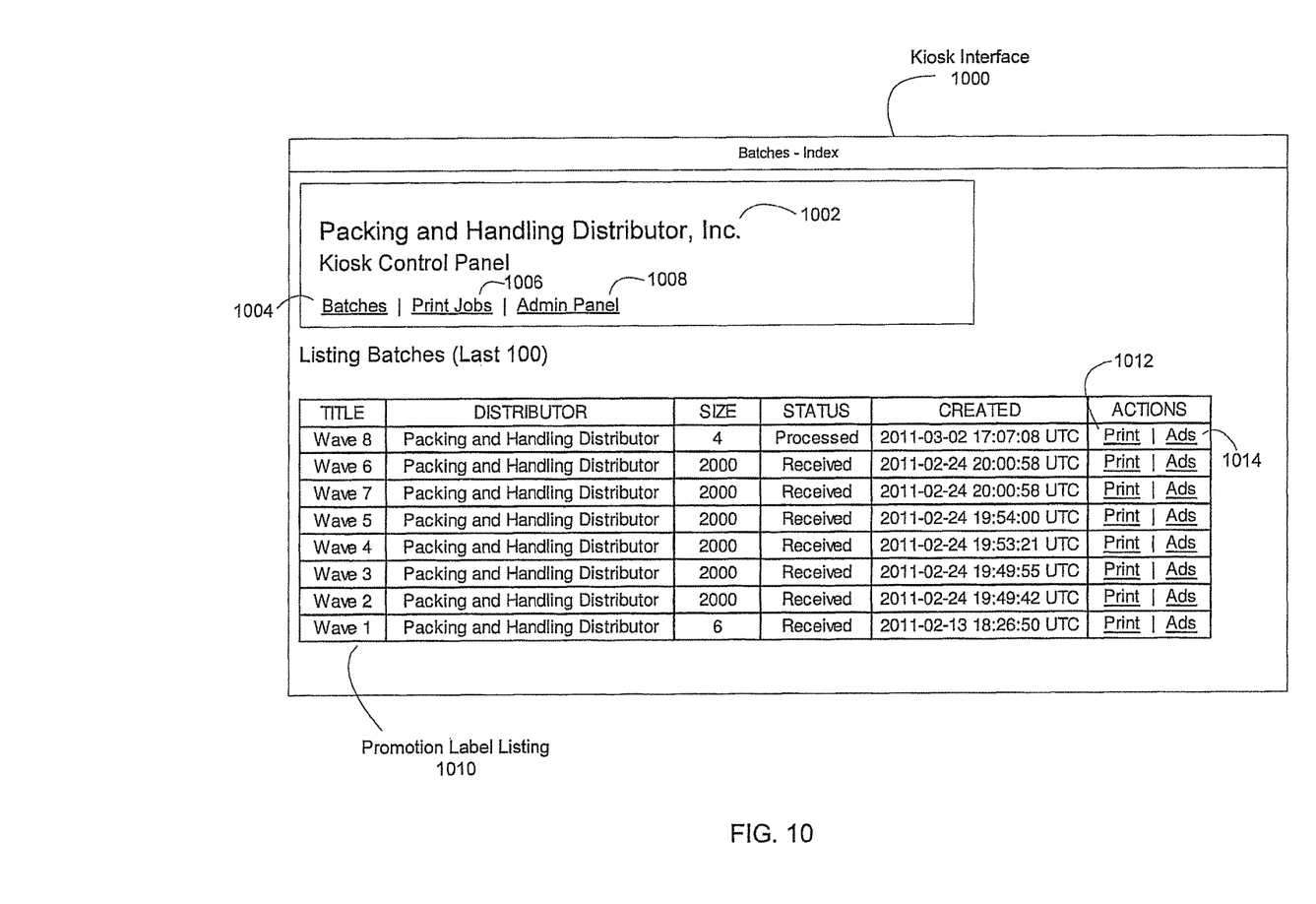
FIG. 10 illustrates a screenshot of kiosk control panel according to an embodiment of the present invention.

FIG. 10 presents a kiosk control panel according to an embodiment of the present invention. Kiosk interface 1000 may be viewed at a kiosk at package and handling distribution systems location to access, view, manage and print promotion labels from a promotion targeting system. In one embodiment, kiosk interface 1000 includes a web-based interface. Any package information or request transmitted to the promotion targeting system for processing may appear in interface 1000 once they are ready for printing.

Kiosk interface 1000 also includes display label 1002, batches link 1004, print jobs link 1006, admin panel link 1008, promotion label listing 1010, print link 1012 and ads link 1014. Accessing batches link 1004 results in kiosk interface 1000 presenting promotion label listing 1010, which displays a batch of promotion labels. Promotion label listing 1010 displays a batch title, distributor, size of the batches, status, time batches were created, and action available for each batch. From the "Actions" column, each batch may be called up for printing by accessing print link 1012. Printing of promotion labels may also be performed by accessing print jobs link 1006. An entire batch may be printed or a subset of promotion labels may be printed. Located in the same "Actions" column, ads link 1014 may be accessed to view the promotion labels in the batches. In an alternative embodiment of the present invention, kiosk interface 1000 may also specify pre-printed promotion labels to place on outgoing packages when promotion labels are not printed on site. In yet another embodiment, kiosk interface 1000 may specify a specific pre-printed promotion label to place in a printer to print additional personalization information on the pre-printed promotion label.

Accessing admin panel link 1008 gives access to configuration options for kiosk interface 1000. Upon accessing the admin panel link 1008, a user may be directed to a login page where the user must enter a username and password to access the configuration options. Configuration options may include adding and removing notification email addresses for incoming batches, setting a default print queue, setting a kiosk label for the kiosk interface 1000, autoprinting, or rebooting the kiosk. Configuration of notification email addresses may provide for email notification of when a batch is received by the kiosk interface 1000 and is ready for printing. A default print queue may be configured to define what printer is pre-selected when a new print job is created. The kiosk label configuration may be used to edit display label 1002 with a text of the user's choice to appear on every page of kiosk interface 1000. Autoprinting may allow batches of promotion labels to be printed upon arrival at the kiosk. Rebooting of the kiosk may be used to reboot a kiosk appliance or device for troubleshooting or maintenance purposes.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A distributed printing system having first and second printers for placing targeted advertisements on parcel packages, the system comprising:
    a promotion targeting printing system including:
        one or more promotion computer servers;
        a first computer database having promotional advertising data; and
        at least a first printer for printing advertising labels having promotional advertising data from the first computer database;
    a parcel distribution printing system including:
        a computer network switch for communicating with the promotion targeting printing system via a computer network;
        one or more parcel distribution computer servers configured and operable to determine and provide information regarding recipient identification of a parcel to be delivered to the one or more promotion computer servers of the promotion targeting printing system to be used by the one or more promotion computer servers to determine supplemental information to be printed on the advertising labels upon analysis of the information provided by the one or more parcel distribution computer servers, via the computer network, from the promotion targeting printing system to the parcel distribution printing system; and
        at least a second printer coupled to the one or more parcel distribution computer servers for printing the supplemental information determined by the first computer database having promotional advertising data on the advertising labels printed by the first printer coupled to the one or more promotion servers.

2. The distributed printing system as recited in claim 1, wherein the parcel distribution printing system further includes a scanner configured and operable to scan a parcel to retrieve said information regarding a parcel to be delivered.

3. The distributed printing system as recited in claim 1, wherein the supplemental information to be printed on the advertising label by the second printer of the parcel distribution printing system includes a name of a consumer.

4. The distributed printing system as recited in claim 1, wherein the advertising labels printed by the first printer of the promotion targeting printing system includes names of one or more recipients.

5. The distributed printing system as recited in claim 1, wherein the supplemental information to be printed on the advertising label by the second printer of the parcel distribution printing system includes date information associated with a promotion.

6. The distributed printing system as recited in claim 1, wherein the promotional advertising data includes upselling of another product.

7. The distributed printing system as recited in claim 1, wherein the promotional advertising data includes cross-selling of another product.

8. The distributed printing system as recited in claim 1, wherein the promotional advertising data includes a loyalty offer.

9. The distributed printing system as recited in claim 1, wherein the promotional advertising data includes a discount offer.

10. A distributed printing system having first and second printers for placing targeted advertisements on parcel packages, the system comprising:
    a promotion targeting printing system including:
        one or more promotion computer servers;
        a first computer database having promotional advertising data; and
        at least a first printer for printing advertising labels having promotional advertising data including a discount offer from the first computer database;
    a parcel distribution printing system including:
        a computer network switch for communicating with the promotion targeting printing system via a computer network;
        one or more parcel distribution computer servers configured and operable to determine and provide information regarding recipient identification of a parcel to be delivered to the one or more promotion computer servers of the promotion targeting printing system to be used by the one or more promotion computer servers to determine supplemental information to be printed on the advertising labels upon analysis of the information provided by the one or more parcel distribution computer servers whereby the determined supplemental information is transmitted, via the computer network, from the promotion targeting printing system to the parcel distribution printing system; and
        at least a second printer coupled to the one or more parcel distribution computer servers for printing 1) the supplemental information determined by the first computer database having promotional advertising data on the advertising labels printed by the first printer coupled to the one or more promotion computer servers and 2) the name of one or more recipients.

* * * * *